United States Patent
Evans et al.

(10) Patent No.: US 12,481,663 B2
(45) Date of Patent: Nov. 25, 2025

(54) UNIFIED DESCRIPTION SCHEME FOR CONTROLLING AND OPERATING NETWORK CONNECTED DEVICES

(71) Applicant: Comcast Cable Communications, LLC, Philadelphia, PA (US)

(72) Inventors: David Kenneth Evans, Los Altos Hills, CA (US); Michael Alexander Yurochko, Los Gatos, CA (US); Yaron Sheba, Mountain View, CA (US); Kristopher Charles Linquist, Milpitas, CA (US); Hitesh Kalra, Cupertino, CA (US); David Frank Russell Weir, San Jose, CA (US); Rajiv Ramanasankaran, San Jose, CA (US); Shalin Harshadkumar Patel, San Carlos, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/336,846

(22) Filed: Jun. 16, 2023

(65) Prior Publication Data

US 2023/0409580 A1    Dec. 21, 2023

Related U.S. Application Data

(63) Continuation of application No. 15/092,501, filed on Apr. 6, 2016, now Pat. No. 11,720,571.
(Continued)

(51) Int. Cl.
G06F 16/2457    (2019.01)
G06F 16/21    (2019.01)
H04L 67/12    (2022.01)

(52) U.S. Cl.
CPC ........ *G06F 16/24573* (2019.01); *G06F 16/21* (2019.01); *H04L 67/12* (2013.01)

(58) Field of Classification Search
CPC ..... G06F 16/24573; G06F 16/21; H04L 67/12
See application file for complete search history.

(56) References Cited

U.S. PATENT DOCUMENTS 7,133,907 B2    11/2006 Carlson et al.
9,210,534 B1    12/2015 Matthieu et al.
(Continued)

FOREIGN PATENT DOCUMENTS

ES    2767048 T3 *    6/2020    ......... H04L 41/0806

OTHER PUBLICATIONS

Mios, Main Page, Las modified Apr. 23, 2015, 2 Pages, [online] [retrieved on Jan. 12, 2017] Retrieved from the internet <URL:http://wiki.mios.com/index.php/Main_Page>.
(Continued)

*Primary Examiner* — Richard G Keehn
(74) *Attorney, Agent, or Firm* — BakerHostetler

(57) ABSTRACT

The present disclosure relates to configuring and operating Internet of things (IoT) elements connected by a network. A computing device receives an interface component corresponding to an IoT element. The computing device retrieves a description of the interface component at least describing a set of restrictions of an operation of the IoT element. The computing device deploys the interface component in the computing device to at least translate events and commands specific to the IoT element to common events and commands for processing in the computing device. The computing device sends at least a subset of the description of the interface component to a user device to cause the user device to generate a user interface for configuring the operation of the IoT element.

20 Claims, 5 Drawing Sheets

Related U.S. Application Data

(60) Provisional application No. 62/206,143, filed on Aug. 17, 2015.

(56) References Cited

U.S. PATENT DOCUMENTS

| | | | |
|---|---|---|---|
| 9,600,571 B2 | 3/2017 | Shaashua et al. | |
| 11,876,868 B2* | 1/2024 | Atarius | H04L 9/3239 |
| 2008/0256014 A1 | 10/2008 | Gould et al. | |
| 2010/0138007 A1 | 6/2010 | Clark et al. | |
| 2010/0162210 A1 | 6/2010 | Briden et al. | |
| 2010/0175010 A1 | 7/2010 | Jeyabalan et al. | |
| 2011/0276908 A1 | 11/2011 | O'Riordan | |
| 2014/0047322 A1 | 2/2014 | Kim et al. | |
| 2014/0244833 A1 | 8/2014 | Sharma et al. | |
| 2015/0019710 A1 | 1/2015 | Shaashua et al. | |
| 2015/0019714 A1 | 1/2015 | Shaashua et al. | |
| 2015/0347114 A1* | 12/2015 | Yoon | H04L 12/2832 |
| | | | 717/176 |
| 2016/0041534 A1 | 2/2016 | Gupta | |
| 2016/0043962 A1 | 2/2016 | Kim et al. | |
| 2016/0044032 A1 | 2/2016 | Kim et al. | |
| 2016/0048114 A1 | 2/2016 | Matthieu et al. | |
| 2016/0065653 A1 | 3/2016 | Chen et al. | |
| 2016/0080932 A1 | 3/2016 | Jin et al. | |
| 2016/0112240 A1 | 4/2016 | Sundaresan et al. | |
| 2016/0135241 A1 | 5/2016 | Gujral et al. | |
| 2016/0147402 A1 | 5/2016 | Muench | |
| 2016/0173293 A1 | 6/2016 | Kennedy | |
| 2016/0179993 A1 | 6/2016 | Maturana et al. | |
| 2016/0182309 A1 | 6/2016 | Maturana et al. | |
| 2016/0197798 A1* | 7/2016 | Britt | H04L 67/306 |
| | | | 370/254 |
| 2016/0226732 A1 | 8/2016 | Kim et al. | |
| 2016/0241445 A1 | 8/2016 | Kim | |
| 2016/0255066 A1 | 9/2016 | Green et al. | |
| 2016/0308861 A1 | 10/2016 | Ameling et al. | |
| 2016/0357522 A1 | 12/2016 | Wee et al. | |
| 2016/0357524 A1 | 12/2016 | Maluf et al. | |
| 2016/0374134 A1* | 12/2016 | Kweon | H04W 12/06 |
| 2016/0379464 A1 | 12/2016 | Sedayao et al. | |
| 2017/0005390 A1* | 1/2017 | Zakaria | H04L 67/12 |
| 2017/0005820 A1 | 1/2017 | Zimmerman et al. | |
| 2017/0024290 A1 | 1/2017 | Kaulgud et al. | |
| 2017/0026472 A1 | 1/2017 | Bugenhagen et al. | |
| 2017/0048476 A1 | 2/2017 | Freiin et al. | |
| 2017/0052688 A1 | 2/2017 | Evans et al. | |
| 2017/0054810 A1 | 2/2017 | Evans et al. | |
| 2017/0063611 A1 | 3/2017 | Sheba et al. | |
| 2018/0191867 A1 | 7/2018 | Siebel et al. | |

OTHER PUBLICATIONS

Nest Labs, "API Introduction," Archived on web.archive.org on Jun. 26, 2014, 5 Pages, [online] [retrieved on Jan. 18, 2017] Retrieved from the internet <URL:http://web.archive.org/web/20140626020517/https://developer.nest.com/documentation/nest-api-intro#close>.

US Patent Application filed on Jun. 30, 2020, entitled "Platform for Controlling and Operating Network Connected Devices", U.S. Appl. No. 16/917,723.

U.S. Appl. No. 62/172,466, filed Jun. 8, 2015 entitled Physical Space Map Overlay and Interaction for an Internet of Things Integrated Developer Environment.

* cited by examiner

UNIFIED DESCRIPTION SCHEME FOR CONTROLLING AND OPERATING NETWORK CONNECTED DEVICES

CROSS REFERENCE TO RELATED APPLICATION

This application is a continuation of U.S. application Ser. No. 15/092,501, filed Apr. 6, 2016, now U.S. Pat. No. 11,720,571, issued Aug. 8, 2023, which claims the benefit of U.S. Application No. 62/206,143, filed Aug. 17, 2015, each of which is incorporated herein by reference in its entirety.

BACKGROUND

1. Field of the Disclosure

This disclosure pertains in general to internet of things, and more specifically to a unified description scheme for internet of things (IoT).

2. Description of the Related Art

In recent years, more and more objects (or things) are being connected to a network infrastructure. Such expanded network of connected objects is often referred to as the internet of things (IoT). The IoT enables interoperability between objects connected to the network as well as expanding user's capability to collect information and/or control operations of these various network of objects. The objects (or things) in IoT include not only traditional computers or networking devices, but other devices such as lamps, audio/video (AV) players, thermometers, lawn sprinklers, and vehicles, which were conventionally used as stand-alone devices.

The number and variety of objects (or things) connected the network has grown exponentially over the years. Typically, different types of objects have different capabilities, functions and attributes. Moreover, different objects often communicate using different protocols. Such protocols include device to device (D2D) communication protocols, device to server (D2S) communication protocols and server to server (S2S) communication protocols.

Due to such diversity in the IoT devices and protocols, it is a daunting task for a user to design and implement a desired configuration of a network of IoT devices. The user not only needs to navigate through different protocols but also needs to fully understand the capabilities, functions and attributes to control multiple IoT devices to configure these devices to operate as desired.

SUMMARY

Embodiments relate to operating Internet of things (IoT) elements connected by a network. An interface component corresponding to an IoT element is received at a computing device. The computing device retrieves a description of the interface component at least describing a set of restrictions of an operation of the IoT element. The computing device deploys the interface component in the computing device to at least translate events and commands specific to the IoT element to common events and commands for processing in the computing device. The computing device sends at least a subset of the description of the interface component to a user device to cause the user device to generate a user interface for configuring the operation of the IoT element.

In one embodiment, the computing device may include, a translation layer, an interface management module, and a user interface module. The interface management module may receive an interface component corresponding to an IoT element, retrieve a description of the interface component at least describing a set of restrictions of an operation of the IoT element, and deploy the interface component to the translation layer to at least translate events and commands specific to the IoT element to common events and commands for processing. The user interface module sends at least a subset of the description of the interface component to a user device to cause the user device to generate a user interface for configuring the operation of the IoT element.

The features and advantages described in the specification are not all inclusive and, in particular. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present disclosure can be readily understood by considering the following detailed description in conjunction with the accompanying drawings.

DETAILED DESCRIPTION

Figure 1:
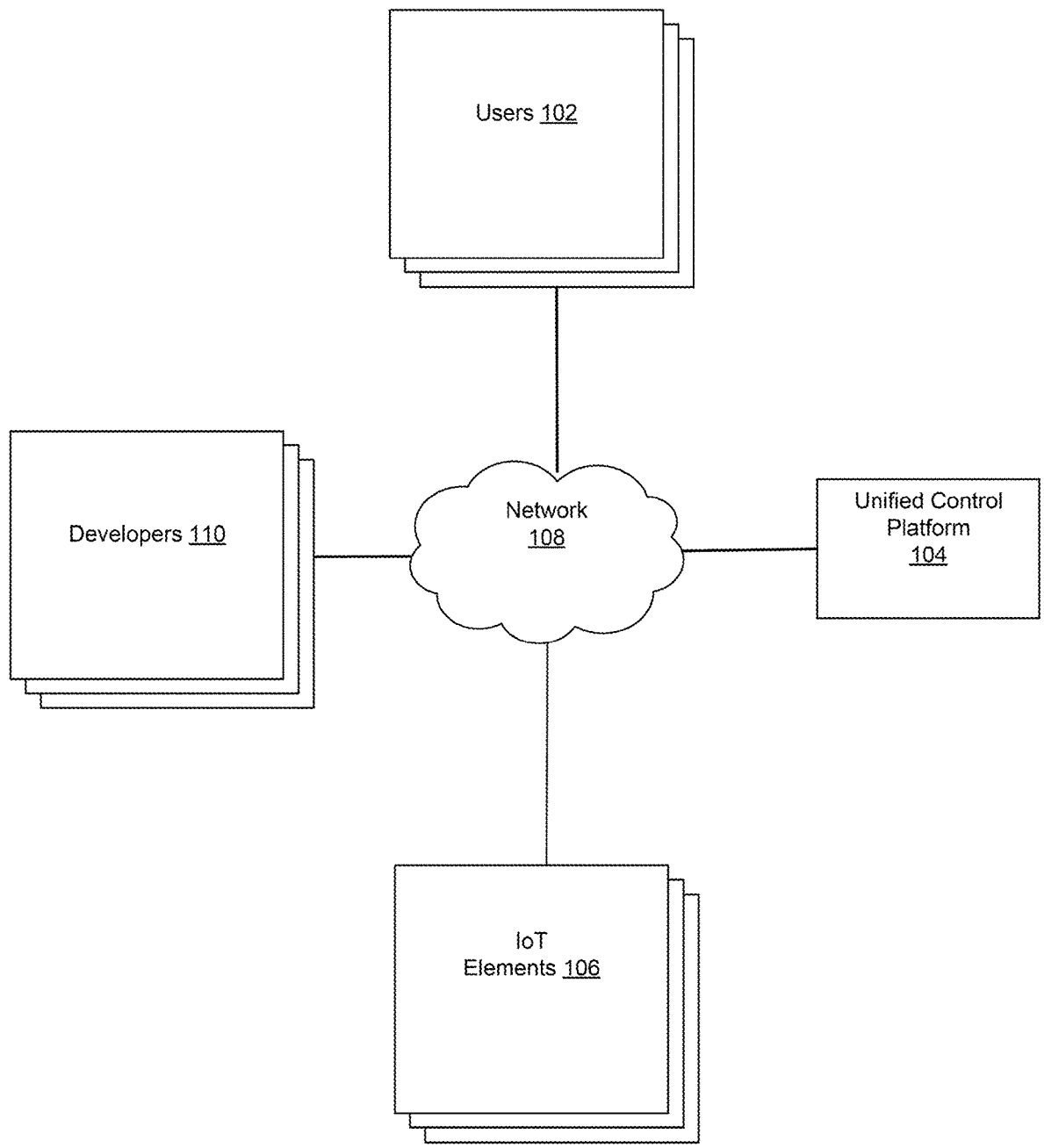
FIG. 1 is a high-level block diagram of a system using a unified control scheme, according to one embodiment.

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein. Reference will now be made in detail to several embodiments, examples of which are illustrated in the accompanying figures. It is noted that wherever practicable similar or like reference numbers may be used in the figures and may indicate similar or like functionality.

The IoT is formed using multiple devices and services that exchange data over a network infrastructure. These devices and services may have various attributes, functions and capabilities, and often involves interplay between different parties such as developers or manufacturers of the devices, operators of the services, and end-users of the devices. Such diversity in devices and services as well as different interests of the involved parties have led to the use of different control schemes and protocols for different IoT devices and services (these devices and services of IoT are hereinafter collectively referred to as "elements").

Embodiments described herein relate to a unified control scheme that facilitates integration of IoT elements using interface components along with their counterpart manifests. Each interface component is associated with an IoT element and functions to translate element-specific events and commands into common events and commands for processing within a unified control platform. Each interface component is associated with a corresponding manifest that enables the unified control platform to model a corresponding IoT element for interoperability with other IoT elements or users. Both the interface component and its counterpart manifest may be made available by a developer or manufacturer of the IoT element.

The unified control platform described herein refers to one or more computing devices that enable coordinated operations of IoT elements by processing events and commands of a plurality of disparate IoT elements with different properties, capabilities (e.g., protocol capabilities) and functions.

IoT elements may include network-connected objects for performing various functions. Such network-connected objects may be used for collecting information (e.g., temperature, activity level, and humidity) as well as taking actions (e.g., turning on a device, increasing or decreasing power, and posting information on social networking services). These objects may operate based on different protocols, interfaces, and application programming interfaces (APIs). IoT elements may also include network-based services. These services may be operated by various entities, which may include the manufacturer or developer of IoT objects. Such services may include, but is not limited to, social networking services (e.g., Facebook and Twitter) and services provided by manufacturer's websites.

Overview of Architecture

FIG. 1 is a high-level block diagram of a system 100 using a unified control scheme, according to one embodiment. The system 100 may include, among other components, users 102, a unified control platform 104, IoT elements 106, developers 110 and a network 108 connecting these components of the system 100. Although the unified control platform 104 is illustrated in FIG. 1 as a single component, the unified control platform 104 may be a distributed system with multiple computing devices dispersed throughout the network 108.

The unified control platform 104 provides a user 102 with integrated control and operation functionality for various IoT elements 106 and also communicates with the users 102 to generate rules defining operations of IoT elements 106 associated with the users 102, as described below in detail with reference to FIGS. 2A and 2B. In some embodiments, the unified control platform 104 is based on an event-driven architecture where interfacing, controls, operation and management of elements 106 are based on events.

A user 102 may download and install a client application of the unified control platform 104 on a user device to establish rules for controlling the IoT elements 106 using the unified control platform 104, send events to the unified control platform 104 and/or receive messages from the unified control platform 104. Alternatively, the client application may be a browser or other programs preinstalled on the user device, in which case no separate installation of the client application is needed. Each user 102 may have control over or interact with a subset of IoT elements 106. Some IoT elements (e.g., social networking services) may be associated with more than one user 102 while others may be associated with a single user. The user 102 may purchase IoT elements 106 from developers or manufacturers (collectively referred to as "developers 110" hereinafter) and deploy these elements 106 for use at one or more physical locations. The client application executed on the user device may also generate user interfaces on a screen of the user device for generating rules for operating the elements 106, as described below in detail with reference to FIG. 4.

Developers 110 provide interface components and manifests corresponding to the IoT elements 106. An interface component is a software component associated with an IoT element to translate element-specific events, protocols, and commands (received or sent to the IoT element) into unified events and commands for processing in the unified control platform 104. The interface component may also encapsulate computation logic specific to an IoT element, for example, by performing a predetermined computation. Interface components can be expressed in various languages or frameworks such as Java, Python, C #, Ruby, and Node.js. Each interface component is associated with a corresponding manifest that describes properties, capabilities, functions and other information that enables the unified control platform 104 to model a corresponding IoT element for interoperability with other IoT elements or users, as described in detail with reference to FIG. 2B and FIG. 3. Developers 110 may be manufacturers of IoT elements 106 or other entities having knowledge about the capabilities, properties and functions of the IoT elements. Developers 110 can create, submit, edit, and update interface components and manifests of elements 106 and make them available for use in conjunction with the unified control platform 104. By having the developers 110 produce interface components and manifests, the developers can retain a tight control over how the IoT elements can be used and configured using the unified control platform 104 while relieving the users 102 and the operator of the unified control platform 104 of the need to deeply understand the capabilities, properties and functions of the IoT elements.

The network 108 may be a wireless or a wired network. The network 108 can be based on technologies including, but not limited to, Ethernet, 802.11, worldwide interoperability for microwave access (WiMAX), 4G, digital subscriber line (DSL), asynchronous transfer mode (ATM), InfiniBand, PCI Express Advanced Switching, multiprotocol label switching (MPLS), a Global System for Mobile Communications (GSM), General Packet Radio Service (GPRS), Enhanced Data Rates for GSM Evolution (EDGE), Universal Mobile Telecommunications System (UMTS), Evolution-Data Optimized (EV-DO), Code Division Multiple Access (CDMA), Z-Wave, Zigbee and Bluetooth low energy (BLE).

Example Architecture of Unified Control Platform

Figure 2A:
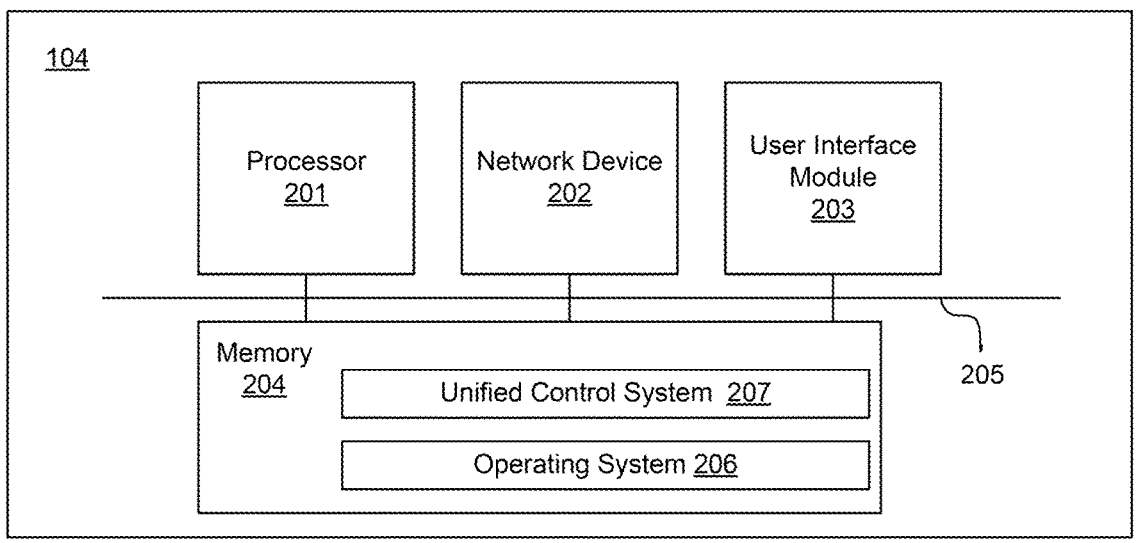
FIG. 2A is a block diagram of the unified control platform, according to one embodiment.

FIG. 2A is a block diagram of the unified control platform 104 according to one embodiment. The unified control platform 104 may include, among other components, a processor 201, a network device 202, a user interface module 203, a memory 204 (i.e., a non-transitory computer-readable storage medium) and a bus 205 connecting these components.

The processor 201 executes instructions to perform operations on the unified control platform 104. At least part of the executed instructions is stored in the memory 204. The memory 204 stores software modules including an operating system 206 and a unified control system 207. The operating system 206 manages resources available in the unified control platform 104. The unified control system includes software modules for configuring and executing rules for controlling IoT elements 106, and interacting with developers 110 and users 102, as described below in detail with reference to FIG. 2B. The network device 202 may include hardware, software, firmware and a combination thereof for communicating with the elements 106, the users 102 and the developers 110 over the network 108. The network device 202 may be embodied as a network card.

Figure 2B:
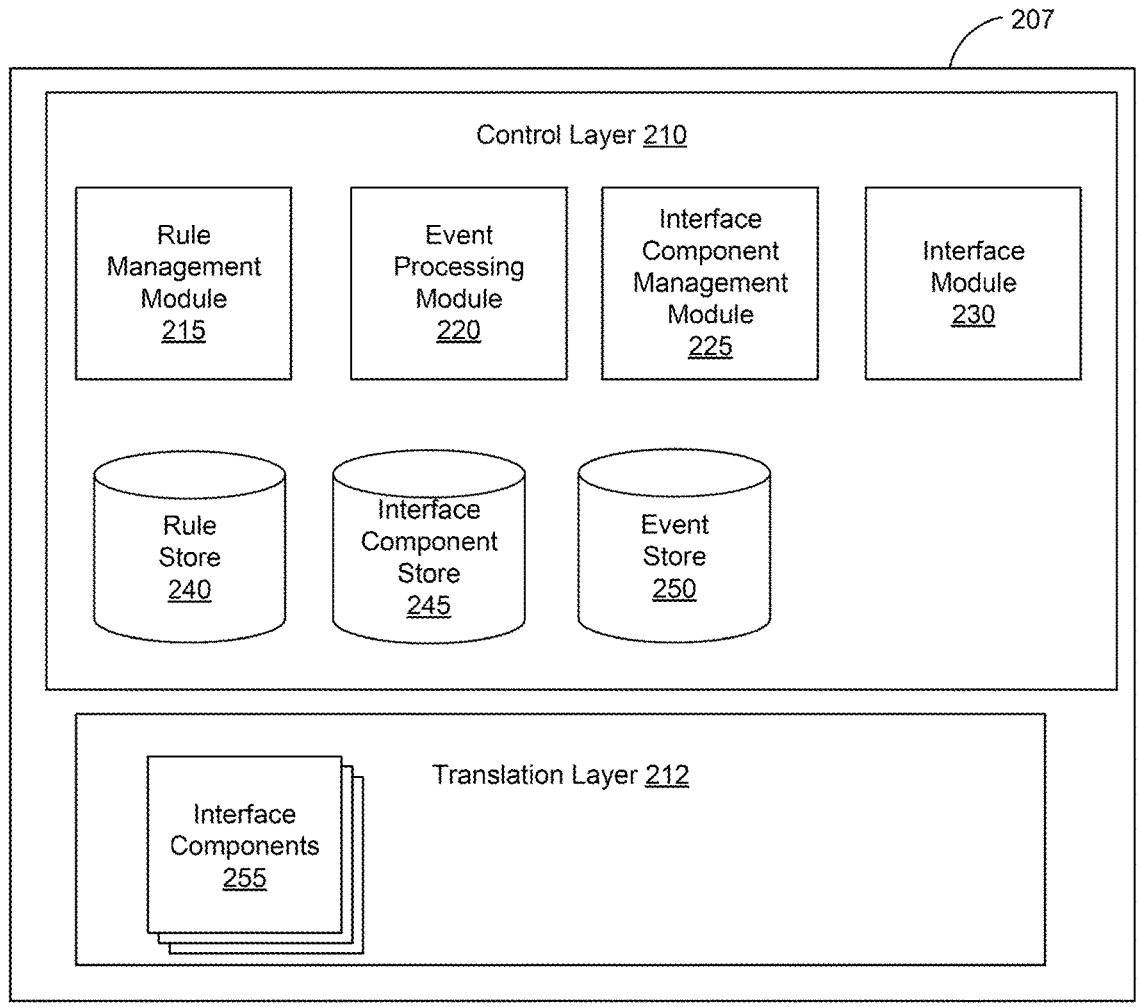
FIG. 2B is a block diagram of the unified control system, according to one embodiment.

FIG. 2B is a block diagram of the unified control system 207, according to one embodiment. The unified control system 207 may include, among other software components, a control layer 210 and a translation layer 212. The control layer 210 is responsible for interacting with the user 102 to set up rules for operating the elements 106 and executing these rules after they are set up by the user 102. The translation layer 212 serves as a bridge between the control layer 210 and elements 106 using unified events and commands.

The control layer 210 may include, among others, a rule management module 215, an event processing module 220, an interface component management module 225, an interface module 230, a user interface module 235, a rule store 240, an interface component store 245, and an event store 250. Other embodiments may have different and/or additional modules other than what is described with reference to FIG. 2B. Furthermore, the functionalities of these modules can be distributed among the modules in a different manner.

The translation layer 212 includes a plurality of interface components 255 to interface with the corresponding elements 106. In one or more embodiments, the translation layer 212 includes the same number of interface components 255 as the number of IoT elements 106 so that a one-to-one relationship is established between each interface component 255 and its corresponding IoT element 105. In other embodiments, a single interface component may represent multiple IoT elements.

An interface component may include, for example, three parts: an IoT element connector, a data processor and a control layer connector. The IoT element connector is software code that interfaces with a corresponding IoT element and communicates with the corresponding IoT element using an API specific to the element. The control layer connector is software code that connects and interfaces with the control layer 210. The control layer connector sends events and commands to the control layer 210 and receives unified events and comments from the control layer 210 using an API that is common across different interface components. The data processor is software code that performs data processing including, parsing, computing, and polling.

In one or more embodiments, an interface component may be deployed for an IoT element that is not yet physically deployed. Instead, an interface component may represent a virtual IoT element and enable an interface component management module 225 to simulate actual deployment of the element 106.

The rule management module 215 creates, stores, and manages rules for controlling elements 106 per instructions from the users 102. A rule describes conditions (e.g., occurring of triggering events) and actions as a result of satisfying certain conditions. For example, a rule may describe turning on an IoT element (action) when a certain time is reached (condition). The rule management module 215 may associate a user with rules created by the user and store such association in the rule store 240. In addition, when a user requests updating or deleting of an existing rule, the rule management module 215 updates or removes the existing rule in the rule store 240.

The rule store 240 is a storage module for storing the created rules. The rules stored in the rule store 240 may be accessed by the event processing module 220 to process events and generate commands. The rule store 240 may also identify users authorized to use each rule.

The event processing module 220 processes events to control the elements 106 according to the rules stored in the rule data store 205. Events are messages communicated within the unified control platform 104 and may indicate, for example, temperature changes, receiving of a new email, and reaching a certain time limit. Events may be generated by interface components 255, the translation layer 212, the rule management module 215 as well as the interface module 230. The event may be in the form of an event packet which includes, for example, a source of the event, a destination of the event, a timestamp indicating when the event packet was generated, a protocol associated with the event, the user associated with the event, and a payload. The payload describes additional information about the event and content dependent on the event's protocol. The file content of the event packet may be expressed in JavaScript Object Notation (JSON), or a similar widely-used format. In some embodiments, events are not processed in real time. In such embodiments, event packets not yet processed may be stored in the event store 250 and then be routed to proper destinations for further processing. After processing the events, the event processing module 220 may send commands, when conditions are met, to the interface components 225 to cause predetermined actions at the corresponding elements 106.

The interface component management module 225 registers, stores, and manages interface components and their corresponding manifests. A manifest provides information associated with various aspects of a corresponding interface component, and is described below in detail with reference to FIG. 3. In some embodiments, the interface components 255 are hosted and deployed in the translation layer 212 after being registered by the interface component management module 225. The interface components 255 are included in the translation layer 212 after being registered by the interface component management module 225. In other embodiments, the interface components 255 are hosted in other platform (e.g., a trusted partner server) or even the IoT elements themselves.

After being registered, interface components 255 interface between the control layer 210 and the IoT elements 106 using a common API. In one or more embodiments, the interface components 255 maintain connections with the elements 106 and periodically retrieve updates from the elements 106 to maintain the states of the elements 106.

In some embodiments, an IoT element 106 can interface via one or more interface components, some of which may be provided by different developers. Each of the interface components corresponding to the same IoT element 106 may enable users to take advantage of different sets of functionalities or capabilities of the IoT elements.

The interface component management module 225 registers an interface component when it becomes newly available to the unified control system 207 or when the interface component becomes updated. When an interface component 255 is submitted by a developer, the interface component management module 225 registers the interface component 255 using manifest corresponding to the interface component 255. During the registration process of an interface component, the interface component management module 225 may (i) assign an interface component identify (ID) to the interface component, (ii) store the interface component 255 with the associated ID in the interface component store 245, (iii) retrieve manifests associated with the interface components, (iv) extract information from the manifests, (v) make a subset of information in the manifests available to the client application on user devices and (vi) identify security methods and protocols (e.g., OAuth and OAuth2), if any, to be use used with an IoT element corresponding to the interface component. An interface component and its associated manifest may be registered via a development tool or portal at the time of submission. For example, the interface component sends the manifest to the unified control platform 104 via an initial interface component registration process. Standard security protocols such as, but not limited to, SSL/TLS, OAuth/OAUTH2 may be used. In one embodiment, the interface component 255 is registered at the interface component management module 225 by calling a specific uniform resource locator (URL) and submitting a developer API key for authentication to the interface component management module 225.

The interface module 230 manages connections with the users 102 and developers 110. The interface module 230 performs user authentication and user account management functions so that authorized users and developers can access, modify and remove rules, interface components and manifests in unified control platform 104. The interface module 230 (i) sends messages from the event processing module 220 to a user, (ii) throttles and load balances incoming requests to prevent requests overloading the unified control platform 104, and (iii) directs a request to a proper module for further processing. For example, a client's request to create a rule is directed to the rule management module 215 for processing, and a developer's request to update an interface component is directed to the interface component management module 225 for processing.

In addition, the interface module 230 provides a subset of information in the manifest to the client application. The subset of information may include all or part of metadata, all or part of API details and user interface (UI) information, as described below in detail with reference to FIG. 3. The UI information enables the users 102 to set rules and configure the elements 106 using, for example, a graphical user interface on the user device. The interface module 230 may also provide software code for preparing manifests to the developers 110. In one or more embodiments, the developer may decide which parts of the metadata should be sent to the client application 408 while other parts of the metadata should be retained in the unified control platform 104 and not made publicly available.

Example Structure of Manifest

A manifest is associated with an interface component to describe various information associated with the interface component or its counterpart IoT element. The manifest may be available from a source separate from the interface component. For example, when a developer provides an interface component, a manifest is provided along with the interface component. Manifests are generally generated and provided by a developer who understands various aspects of the IoT elements or its interface component. In most cases, the manifests are provided by the same entity that develops their corresponding interface components.

Figure 3:
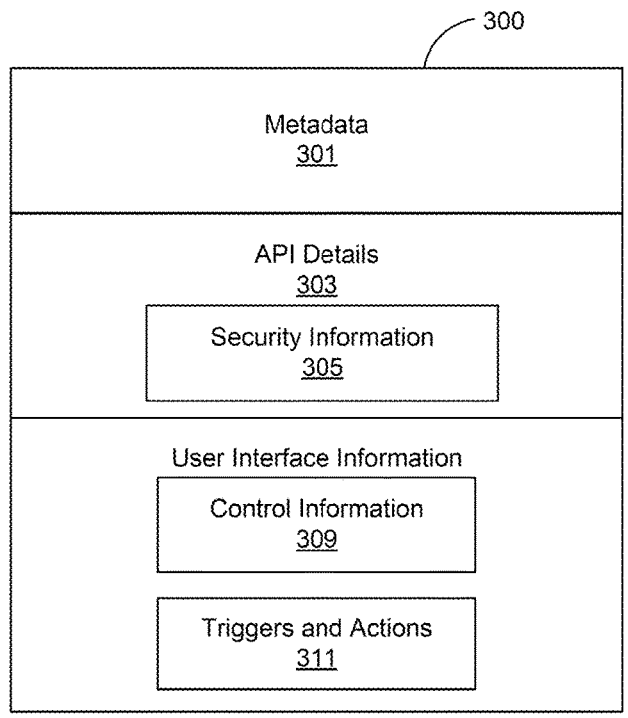
FIG. 3 is a block diagram illustrating an example structure of a manifest, according to one embodiment.

FIG. 3 is a block diagram illustrating an example structure of a manifest 300, according to one embodiment. The example manifest 300 includes the following fields: (i) metadata 301, (ii) API details 303, (iii) UI information 307. The API details 303 includes a security information 305 subfield. The UI information 307 includes subfields: (i) control information 309, and (ii) triggers and actions 311.

These are examples, and other manifests can include additional data fields or omit some of these data fields. An example manifest and pseudo-codes associated with the manifest is provided in Appendix A.

The metadata 301 describes the attributes of an IoT element or its associated interface component. Example attributes include manufacturer of the element, model or version number of the IoT element, the operating system of the element, possible states of the IoT element (e.g., on and off states), and protocols compatible with the IoT element. The metadata 301 may also contain URLs to other interface components (e.g., additional JSON documents) which enable or disable certain functionality of the IoT element. The metadata also describes relationships of its counterpart IoT element to other IoT elements such as a hub required for operation of the counterpart IoT element.

The API details 303 include information about the API installed on the IoT element. For example, the API details indicates URLs to access in order for an interface component to obtain information from a source (e.g., weather information from a weather service). The API details 303 also contains, but is not limited to, credentials such as an access tokens, refresh tokens, and keys used to access the service.

The security information 305 describes the security-related items such as authentication methods. Many IoT elements need to be authenticated before they can be controlled or accessed by a user. For example, a user may have to log into a user account to control a thermostat. The security information 305 describes how a user and/or the unified control platform 104 can obtain authentication for the operation and control of an IoT element. Example data for the security information 305 may include, among other information, required information for authenticating a user authorized to use the IoT element (e.g., user name and password), encryption scheme for communicating with the IoT element. The unified control system 207 may use security information 305 to construct an appropriate authentication interface for the particular element. The UI information 307 describes the user interface, layout, and related UI details associated with an interface component or its counterpart IoT element. The UI information 307 may be extracted by the interface component management module 225 and be sent to the user device via the interface module 230 so that certain UI elements (e.g., graphical user interface elements) may be displayed to the user at the user device, as described below in detail with reference to FIG. 4.

The UI information 307 may include information such as positions of a UI element, dimensions of the UI element, identification of UI element (e.g., image, checkbox, dropdown menu), properties associated with the UI element (e.g., appearance, value and range). Examples of UI elements and pseudo-codes associated with the UI elements are provided in Appendix B. The example UI design is for illustration purposes. Other UI designs, UI controls, and/or layout scheme may be defined in manifests. The UIs to interface with the element and the virtual representation of the element can be presented to a user, for example, on a user device when the client application is executed.

The control information 309 and triggers and actions 311 include information about how IoT elements can be operated. The control information 309 describes methods of operating and controlling IoT elements directly. A method refers to a function or operation that can be taken at an IoT element. For example, an interface component for a lamp may support an 'on' method for turning on the light, an 'off' method for turning off the light, and a 'brightness' method for adjusting brightness of the lamp. The triggers and actions 311 describe event-based processes of operating and controlling IoT elements. Specifically, the triggers and actions 311 include information about triggering events that trigger the control and/or operation described in the control information 309 as well as actions performed by IoT elements as a result of the triggering events. An event is an action or occurrence detected and reported by an interface component for handling by the event processing module 220. For example, an interface component of a lamp generates an event notifying to the event processing module 220 that a light was turned off.

The methods specified in the control information 309 and triggers and actions 311 indicate to the unified control platform 104 how an element 106 can be operated. The event processing module 220 of the control layer 210 uses the information provided by the control information 309 and triggers and actions 311 to generate events and commands that can be translated by the interface component to send out element-specific events and commands to the corresponding IoT element. The triggers and actions 311 also describe events associated with the IoT element.

Figure 5:
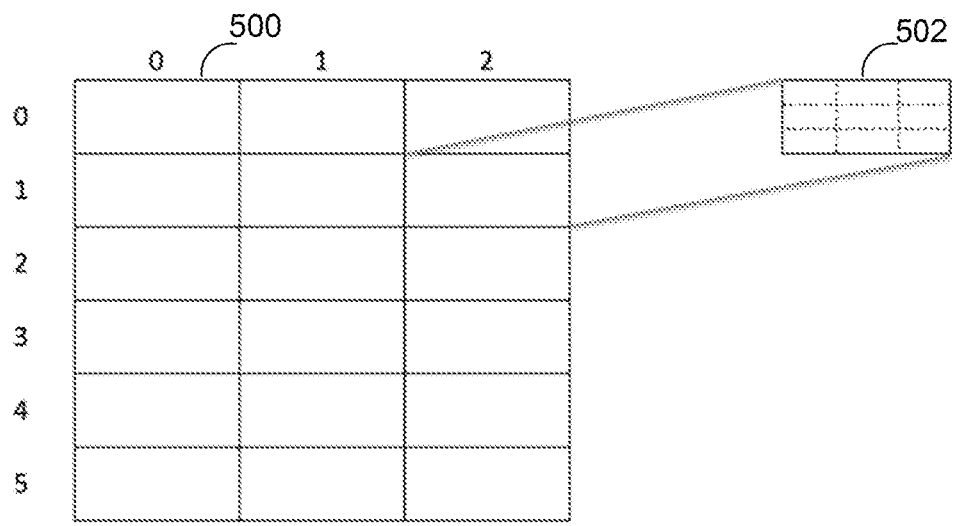
FIG. 5 illustrates an example of User Interface (UI) template, according to one embodiment.

FIG. 5 illustrates an example of UI template 500, according to one embodiment. In some embodiments, the UIs defined in the manifest are placed on a UI template when displayed on the user device. The example UI template 500 includes 6 rows (e.g., rows 0 through 5) and 3 columns (e.g., columns 0 through 2). Each cell 502 of the example UI template 500 defined by a row and a column includes a template cell layout configured to align content within a given cell. The interface data fields section includes data fields configured to address each row, each column, as well as the cell defined by a row and a cell. For example, a data field with values (0, 0) of (x, y) coordinate system represents the upper left cell of the template. The interface data fields section includes data fields (e.g., vAlign, hAlign) configured to align content within each cell. For example, the data field "vAlign" has values (e.g., top, center, bottom) and the data field "hAlign" has values (e.g., left, center, right) to indicate predetermined positions within each cell.

The UI information 307 of the manifest may further include data fields for describing the content (e.g., control element and associated attributes) of each cell. For example, the interface data fields section may include data fields for control element type (e.g., label, statusbox, onclick, an image, a checkbox, textbox, button, togglebutton, radialcontrol, modepicker, segmentedcontrol, a dropdown menu, a colorpickercircle, a slider, doubleslider, picker, timepicker, datepicker, timedatepicker, map, numericupdown, imagepicker, sunrisesunset, etc.).

The UI information 307 may further include data fields for each control element. For example, for a status box, the data fields include name (e.g., with values such as "imagelist," "captionlist," "statusindex"), description (e.g., with values such as "image URLs to display inside status box," "caption to display below image," "index of caption to set"), type (e.g., with values such as string array, integer), and allow null (e.g., with values such as true or false). The UI information 307 includes information about the presentation of user interface to be presented to a user as well as information about the control (e.g., signals generated in response to an event, state change in response to an event).

The UI information 307 may also specify requirements for taking advantage of certain features of the IoT element. The UI information 307 may indicate that certain UI elements be grayed out or lock certain UI elements in a position unless further action is taken by the user (e.g., purchasing of advanced features for the IoT element from the developer).

Example User Device

Figure 4:
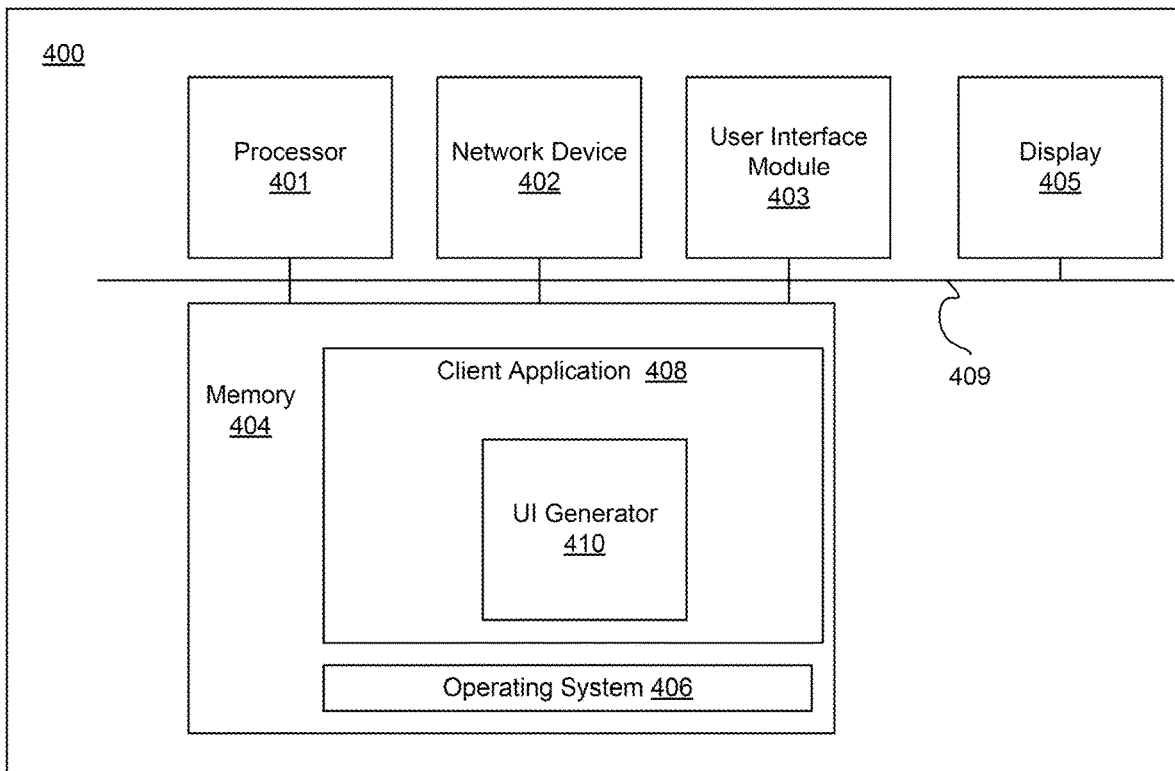
FIG. 4 is a block diagram illustrating a user device for accessing the unified control platform, according to one embodiment.

FIG. 4 is a block diagram illustrating a user device 400 for accessing the unified control platform 104. The user device 400 is used by a user 102 to define rules, send events and commands to the unified control platform 104, and receive messages from the unified control platform 104. The user device 400 may be a computing device such as a cellphone, a smart phone, a tablet, a laptop and a wearable device. The user device 400 may include, among other components, a processor 401, a network device 402, a user interface module 403, a display 405, a memory 404 (i.e., a non-transitory computer-readable storage medium), and a bus 409 connecting these components.

The processor 401 executes commands to perform various operations on the user device 400. The operations include processing messages received from the unified control platform 104 and communicating with the unified control platform 104 to define and execute rules for controlling the IoT elements 106.

The network device 402 may include hardware, software, firmware and a combination thereof for communicating with the unified control platform 104 over the network 108. The network device 402 may be embodied as a network card.

The user interface module 403 is hardware that may be combined with software and/or firmware for receiving user input from the user. The user interface module 403 may include touch screens, keyboards, keypads, and pointing devices (e.g., mouse).

The display 405 is hardware that may be combined with software and/or firmware to display user interface elements to the user. The display 405 may be embodied using liquid crystal display (LCD), organic light emitting diodes (OLED), and bistable display technology.

The memory 204 stores software modules including an operating system 406 and a client application 408 for the unified control platform 104. The operating system 206 manages resources available in user device 400. The client application 408 is a software module for communicating with the unified control platform 104 to perform various operations associated with controlling the IoT elements 106. The client application 408 enables users to access the unified control platform 104, set up rules to operate one or more IoT elements 106, and display messages from the unified control platform 104 to the user.

In one embodiment, the client application 408 includes a user interface (UI) generator 410 for generating various graphical user interface elements. The UI generator 410 generates and displays various screens on the display 405 such as (i) a grid screen used for configuring rules for operating the IoT elements 106 and (ii) an interface component/element detail screen showing events, actions, functions and capabilities of an IoT element. Such grid screen or the interface component/element detail screen is generated using the UI information 307 extracted from a corresponding manifest, as described above with reference to FIG. 3.

Method of Using Manifests

Figure 6:
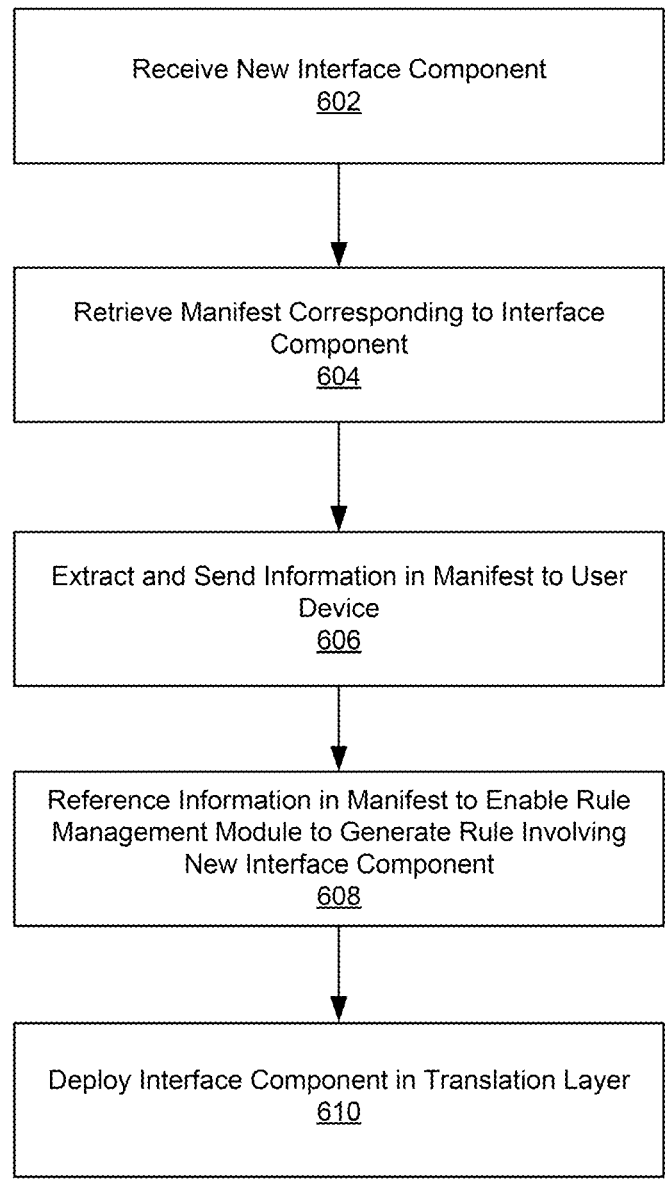
FIG. 6 is a flowchart illustrating a process of using a manifest in the unified control platform, according to one embodiment.

FIG. 6 is a flowchart illustrating a process of using a manifest in the unified control platform 104, according to one embodiment. First, a new interface component is received 602 at the unified control platform 104. The new interface component may be received, for example, from a developer of an IoT device.

A manifest corresponding to the interface component is retrieved 604. In one embodiment, the manifest may be extracted from the new interface component. In other embodiments, the manifest may be retrieved from a source such as a developer's website. The manifest may be assigned and associated with an interface component ID that is unique to each interface component.

All or a subset of information described in the manifest is extracted and sent 606 to the user device. As one example, information such as some or all metadata 301, security information 305 of API details 303, UI information 307 including control information 309 as well as triggers and actions 311 is extracted. The user device presents information about the IoT device associated with the new interface component, for example, based on the UI information 307. The user device may also present configurable options associated with the IoT device to define rules for operating the IoT element.

To enable the rule management module 215 to generate a rule involving an IoT element associated with the new interface component, information in the manifest is referenced 608 by the rule management module 215. The rule may be generated by interaction between the rule management module 215 and the client application 408 on the user device 400. In one or more embodiments, the client application refers to a subset of information (e.g., UI information) extracted from manifest and enables the user to set rules according to restraints as defined by the subset of information. The rules configured using the client application is sent and processed by the rule management module 215 to generate a rule. During operations to generate the rule, the rule management module 215 may allow certain configurations of IoT elements while rejecting other configurations based on the information included in the manifest.

When a user attempts to use an IoT element associated with the new interface component, the new interface component may be deployed 610 in the translation layer 212. By deploying the new interface component, the event processing module 220 can issue commands to the new interface component and receive events from the new interface component according to the rules.

The process as described in FIG. 6 is merely illustrative. The sequence of steps in FIG. 6 can be modified and additional steps may be added to FIG. 6. For example, the UI information may be sent 606 to the user device after the manifest information is made available for reference 608 by the rule management module or these two steps may be performed in parallel.

Extended Use of Manifests

The use of manifests is advantageous, among other reasons, because the attributes of an interface component of an element can be updated simply by modifying a corresponding manifest. In some cases, different users are provided with different permissions to different data fields in the manifest. As a result, different users can access different attributes of an interface component of an element and different users are given access to different sets of functionalities of the element. For example, a parent can control all channels defined in the manifest of a TV whereas a child can control limited channels defined in the manifest.

Manifests may be used to generate a common manifest by extracting commonality between interface components or IoT elements. As manifests describe functions, properties and capabilities of IoT elements, overlapping functions, properties and capabilities of the IoT elements may be identified by analyzing commonality in data fields of manifests. Using such analysis, a single common manifest to represent different IoT elements may be developed. For example, a gas oven and a microwave oven include the same capabilities and properties such as cooking temperature and on/off methods for turning the devices on or off. Consequently, the manifests associated with both devices would share common data fields. Based on such commonality, a common interface component and manifest can be developed to represent a cooking device that includes both the gas oven and the microwave oven.

While particular embodiments and applications of the present disclosure have been illustrated and described, it is to be understood that the embodiments are not limited to the precise construction and components disclosed herein and that various modifications, changes and variations may be made in the arrangement, operation and details of the method and apparatus of the present disclosure disclosed herein without departing from the spirit and scope of the disclosure.

APPENDIX A

```
{
"properties": { //// Properties section = Metadata
"name": "Lock",
"rosettaId": "rN6T1ZQy", // Rosetta ID
"version": "1",
"family": "Physical",
"brand": "Stringify",
"deviceVersion": "1.0",
"isHub": false,
"requiresHub": true,
"interfaces": [
"zwave"
],
"type": "locks",
"thingColor": "#000000",
"seedTitle": "Lock",
"seedImage": "rN6T1ZQy_1_kCBYYhPM.png",
"premiumOnly": false,
"triggerRequired": false,
"actionRequired": false,
"maxSeeds": 10,
"maxSeedsPremium": 10,
"autoProvision": false, // if true, automatically add to a new user's library
"isSystem": false
},
"api": { // API section (shortened) - describe how to authenticate with the
"type": "oauth2", // device or service.
"oauth2": { client secrets!! }}
},
"ui": { // User Interface section
"elements": [
{
"elementName": "lockDoor", // This is both a trigger and an action
"trigger": true,
"triggerText": "Door is locked",
"broadcast": true,
"action": true,
"actionText": "Lock Door",
"premiumOnly": false,
"reInclude": [
"lock"
```

```
],
"variableInclude": [
"lockName", // Store variables as to when the door was last locked.
"lockedAt" // The user can use these variables in other actions (like
], // text messages)
"operand": "==",
"operandAppliesTo": "lock",
"controlsToInclude": [
{
"name": "lock",
"default": "lock",
"hidden": true,
"initControl": false,
"required": true
}
],
"expireSeconds": 0,
"expectedTriggerDuration": 0,
"expectedActionDuration": 0
},
{
"elementName": "unlockDoor",
"trigger": true,
"triggerText": "Door is Unlocked",
"broadcast": true,
"action": true,
"actionText": "Unlock Door",
"premiumOnly": false,
"reInclude": [
"lock"
],
"variableInclude": [
"lockName",
"unlockedAt"
],
"operand": "==",
"operandAppliesTo": "lock",
"controlsToInclude": [
{
"name": "lock",
"default": "unlock",
"hidden": true,
"initControl": false,
```

```
"required": true
}
],
"expireSeconds": 0,
"expectedTriggerDuration": 0,
"expectedActionDuration": 0
}
],
"console": { // Console/control section - what controls to include in the console/control
"controlsToInclude": [
"lock"
]
}
},
"controls": { // Section defining all of the controls and their properties
"lock": {
"controlType": "segmentedControl",
"triggerCaption": "When status of lock is",
"actionCaption": "Set status of lock to",
"eventTrigger": "none",
"allowMultiple": false,
"allowMultiplePremiumOnly": false,
"items": [
{
"objname": "Lock",
"objvalue": "lock"
},
{
"objname": "Unlock",
"objvalue": "unlock"
}
],
"friendlyVariableName": "Lock status"
},
"lockName": {
"controlType": "variableOnly",
"friendlyVariableName": "Lock name"
},
"lockedAt": {
"controlType": "variableOnly",
"friendlyVariableName": "Locked at"
},
"unlockedAt": {
```

```
"controlType": "variableOnly",
"friendlyVariableName": "Unlocked at"
    }
   }
  }
 }
```

APPENDIX B

A UI includes controls such as an image, a checkbox, a dropdown menu, etc. A manifest defines controls associated with a rosetta.

The following is a visual representation of a lamp presented on a user device:

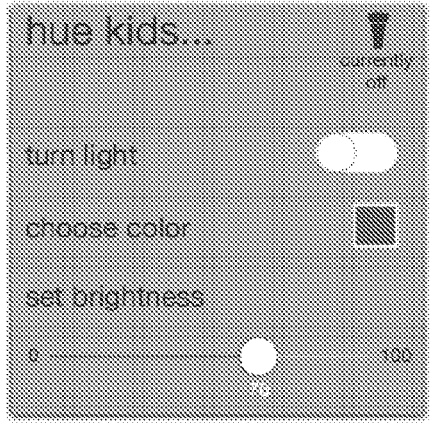

This particular UI contains the following controls (from left to right, top to bottom):

- Header (row 0): A *label* control. Value: "hue kids..."
- Header (row 0): A *statusBox* control: Contains an image, and a caption with a value of: "currently off"
- Row 1: A *label* control. Value: "turn light".
- Row 1: An *onOff* control. State is: off
- Row 2: A *label* control. Value: "choose color".
- Row 3: A *colorPickerCircle* control. State is: unselected
- Row 3: A *label* control. Value: "set brightness".
- Row 4: A *slider* control. Value: 70.

Each control has numerous properties. Properties specify attrributes such as appearance, values, ranges, etc. Below is the complete list of controls and properties in this example.

| Name | statusBox |
|---|---|
| Description | A control that displays an image and optional text to indicate status of a given rosetta. Developer is not allowed to specify the location of this control within the manifest. Developer can specify values, but unified control platform can control the placement. |
| Properties | Name: imageList |

|  | Description: Image URLs to display inside status box. |
|---|---|
|  | Type: string array |
|  | Allow null: true |
|  |  |
|  | Name: captionList |
|  | Description: Caption to display below image. |
|  | Type: string array |
|  | Allow null: true |
|  |  |
|  | Name: statusIndex |
|  | Description: Index of caption to set. |
|  | Type: int |
|  | Allow null: true |
|  |  |
|  | Example: |
|  | A statiusBox can contain three images. |
|  |  |
|  | imageList[3]; |
|  | imageList[0] = "URL to image 1"; // On image |
|  | imageList[1] = "URL to image 2"; // Off image |
|  | imageList[2] = "URL to image 3"; // Attention image. |
|  |  |
|  | captionList[3]; |
|  | captionList [0] = "Thing is on"; |
|  | captionList [1] = "Thing is off"; |
|  | captionList [2] = "Thing needs attention"; |
|  |  |
|  | To request unified control platform to display image 2 and caption 2 inside the Rosetta container, the developer sets the statusIndex to 1. |
| Events | onClick – raises event when the control is clicked. |

| | |
|---|---|
| Example | 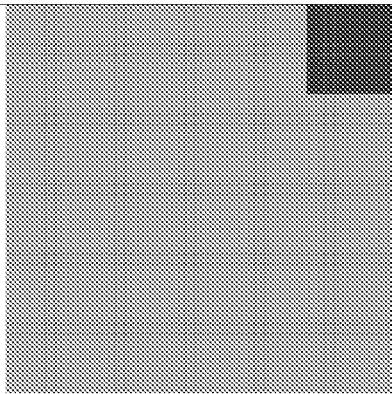<br>Empty status box<br><br>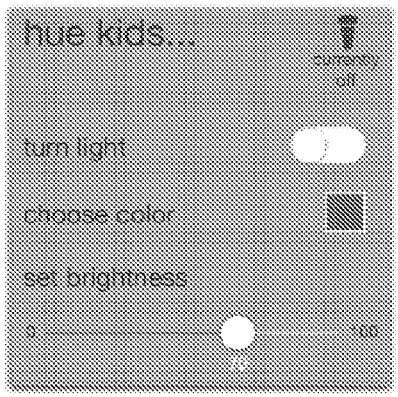<br>Status box with lightbulb icon and caption "currently off". |
| | |
|---|---|
| Name | [1000]　　image |
| Description | A PNG image that supports an alpha channel. |
| Properties | Name: imageUrl<br>Description: URL to obtain statue image from.<br>Type: string<br>Allow null: true |
| Events | onClick – raises event when the control is clicked. |

| | |
|---|---|
| Example | 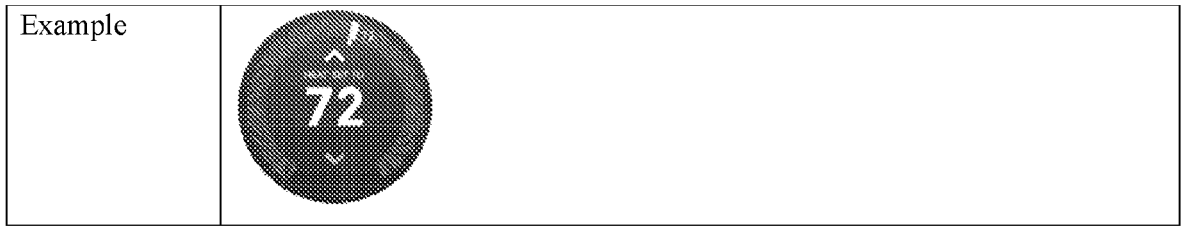 |

| | |
|---|---|
| Name | textbox |
| Description | Enables a user to enter text. |
| Properties | Name: value<br>Description: Default value to display in textbox.<br>Type: string<br>Allow null: true<br><br>Name: hint<br>Description: Light color hint that disspears when user starts typing. Reappears when textbox is empty.<br>Type: string<br>Allow null: true<br><br>Name: multiline<br>Description: Control supports more than one line of text.<br>Type: boolean<br>Allow null: true<br>Default: false<br><br>Name: passwordMask<br>Description: Control supports password masking.<br>Type: boolean<br>Allow null: true<br>Default: false |

| | |
|---|---|
| Events | textChanged – raises event when the text is changed and enter is pressed or the textbox loses focus. Event contains value property. |
| Example | 

Multiline example

Single line example

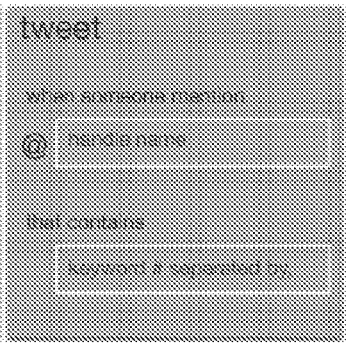 |

| | |
|---|---|
| Name | button |
| Description | A clickable two-state button. |
| Properties | Name: value<br>Description: Text value to display inside button.<br>Type: string<br>Allow null: true |
| Events | onClick – raises event when the control is clicked. |
| Example | None |

| | |
|---|---|
| Name | toggleButton |
| Description | A clickable two-state button where both buttons are shown side-by-side. |
| Properties | Name: value<br>Description: Text values to display inside buttons.<br>Type: string array<br>Allow null: true |
| Events | onClick – raises event when the control is clicked. Index of button selected is passed via event. |
| Example | Locked<br><br>Unlocked<br><br>Full example |

| | |
|---|---|
| Name | radialControl |

| | |
|---|---|
| Description | A "dial" type control displays tick marks at given intervals. Simulates a rotatable interface such as a Nest thermostat, combination lock, etc. Does not rotate visually. Displays a single numeric value that the user can increment or decrement by clicking up and down buttons. |
| Properties | Name: startAngle<br>Description: Angle from 0-360 specifying start of tick marks.<br>Type: int<br>Allow null: true<br><br>Name: spanAngle<br>Description: Angle from 0-360 specifying span of tick marks.<br>Type: int<br>Allow null: true<br><br>Name: interval<br>Description: Interval at which tick marks should appear. For example, a value of 10 means to show a tick mark every 10 degrees.<br>Type: int<br>Allow null: true<br><br>Name: value<br>Description: Numeric value to display inside control.<br>Type: int<br>Allow null: true |
| Events | onRotate – raises event when the control is rotated. Event passes current value.<br>onUp – raises event when the upper part of the control is clicked. Event passes current value.<br>onDown – raises event when the lower part of the control is clicked. Event passes current value. |

| | |
|---|---|
| Example | 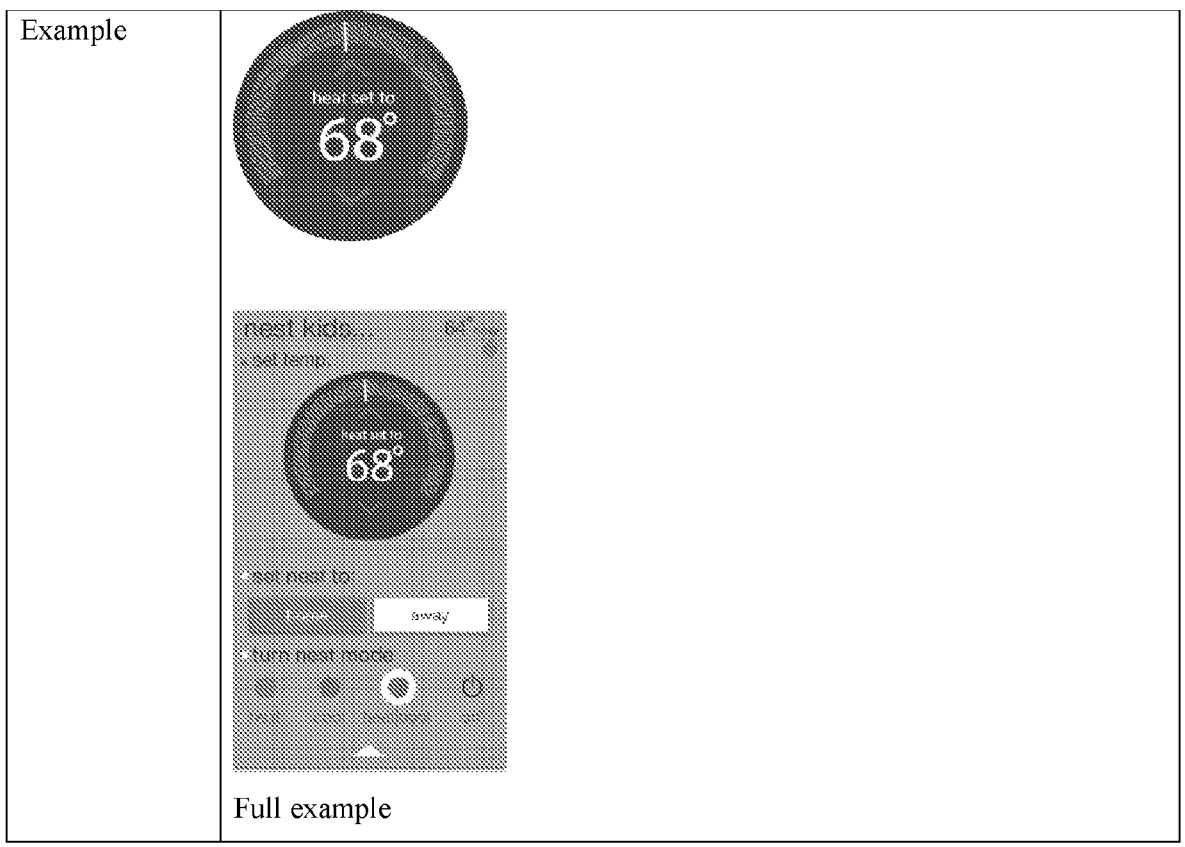<br>Full example |

| | |
|---|---|
| Name | colorPickerCircle |
| Description | Allows a user to select a color via a radial color picker. Shows a color swatch of previously selected color when picker is not expanded. |
| Properties | Name: value<br>Description: Color value to set in swatch and indicate in color wheel.<br>Type: Color<br>Allow null: true |
| Events | onSelect – raises event when a color is selected and confirm is clicked. Color is passed via event. |

| | |
|---|---|
| Example | 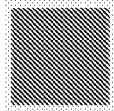
Color swatch. User clicks to expose color wheel.
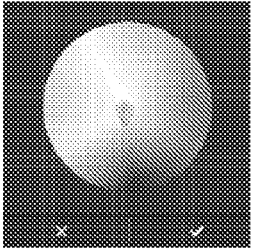
Color wheel is active. |

| | |
|---|---|
| Name | modePicker |
| Description | Control that shows multiple possible selections represented as images or text, where only one can be selected at a time. |
| Properties | Name: value
Description: Text values to display inside segments.
Type: string array
Allow null: true Name: imageList
Description: Image URLs to display inside segments.
Type: string array
Allow null: true |
| Events | onSelect – raises event when an item selection within control is selected. Index of selected item is passed. |
| Example | 
Nothing selected. |

| | |
|---|---|
| | 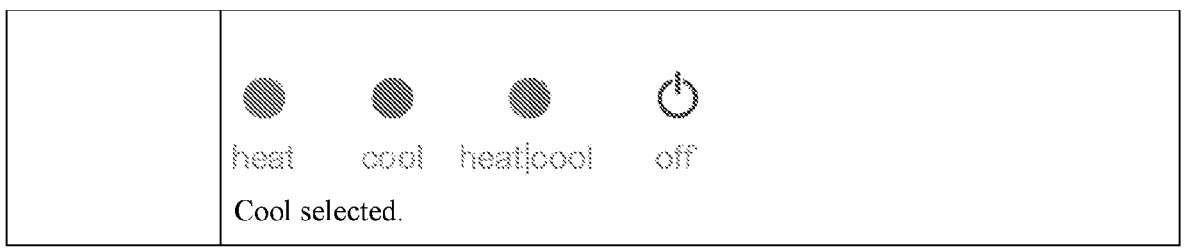<br>Cool selected. |

| | |
|---|---|
| Name | segmentedControl |
| Description | Control that shows multiple possible selections where only one can be selected at a time. Similar to modePicker except that images are not allowed. |
| Properties | Name: value<br>Description: Text values to display inside segments.<br>Type: string array<br>Allow null: true |
| Events | onSelect – raises event when an item selection within control is selected. Index of selected item is passed. |
| Example | |

| | |
|---|---|
| Name | onOff |
| Description | Two state, side-by-side button-style control |
| Properties | Name: value<br>Description: Text values to display inside button segments.<br>Type: string array<br>Allow null: true |

|  |  |
|---|---|
|  | Name: isOn<br>Description: On or Off state<br>Type: boolean<br>Allow null: true<br>Default: false |
| Events | onClick – raises event when control is clicked. Index of selected item is passed. |
| Example | 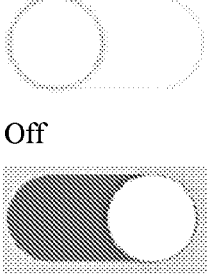<br>Off<br><br>On |

| Name | slider |
|---|---|
| Description | A trackbar-style slider. |
| Properties | Name: value<br>Description: Current value to set for slider. Must be between minimum and maximum values, inclusive.<br>Type: int<br>Allow null: false<br><br>Name: mininum<br>Description: Minimum value of slider.<br>Type: int<br>Allow null: false |

|  |  |
|---|---|
|  | Name: maximum |
|  | Description: Maximum value of slider. |
|  | Type: int |
|  | Allow null: false |
|  | Description: Maximum value of slider. |
|  |  |
|  | Name: orientation |
|  | Description: Orientation of slider. |
|  | Type: horizontonal\|vertical |
|  | Allow null: false |
|  | Default: horizontal |
| Events | onUp – raises event when control is released. Value of slider is passed. |
| Example |  Set to minimum value.<br><br>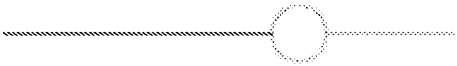 Set to minimum of 0, maximum of 100, and value of 70. |

| Name | doubleSlider |
|---|---|
| Description | A trackbar-style slider with two thumbs. |
| Properties | Name: value1 |
|  | Description: Current value to set for slider. Must be between minimum1 and maximum2 values inclusive. |
|  | Type: int |
|  | Allow null: false |
|  |  |
|  | Name: mininum1 |
|  | Description: Minimum value of slider 1. |

Type: int
Allow null: false

Name: maximum1
Description: Maximum value of slider 1.
Type: int
Allow null: false
Description: Maximum value of slider 1.

Name: value2
Description: Current value to set for slider. Must be between minimum2 and maximum2 values inclusive.
Type: int
Allow null: false Name: mininum2
Description: Minimum value of slider 2.
Type: int
Allow null: false Name: maximum2
Description: Maximum value of slider 2.
Type: int
Allow null: false
Description: Maximum value of slider 2.

Name: orientation
Description: Orientation of slider.
Type: horizontonal|vertical
Allow null: false
Default: horizontal

| | |
|---|---|
| Events | onUp1 – raises event when control slider1 is released. Value of slider1 is passed.<br><br>onUp2 – raises event when control slider2 is released. Value of slider2 is passed via event. |
| Example | None |

| | |
|---|---|
| Name | checkbox |
| Description | A checkbox that can be checked or unchecked. |
| Properties | Name: isChecked<br>Description: Boolean state of the checkbox.<br>Type: boolean<br>Allow null: false |
| Events | onCheck – raises event when the control state changes. State of isChecked is passed via event. |
| Example | None |

| | |
|---|---|
| Name | picker |
| Description | A drop down menu. |
| Properties | Name: value<br>Description: Text values to display inside menu dropdown.<br>Type: string array<br>Allow null: true |
| Events | onSelect – raises event when an item in the menu is selected. Event contains selected text. |
| Example | None |

| | |
|---|---|
| Name | timePicker |
| Description | Displays a time picker that displays all possible 24-hour clock values. User can select a specific time based on hours and minutes. |
| Properties | Name: value<br>Description: Time to set.<br>Type: DateTime<br>Allow null: true |
| Events | onChange – raises event when a the time value is changed. Event contains selected DateTime value. |
| Example | None |

| | |
|---|---|
| Name | datePicker |
| Description | Displays a monthly calendar where a user can navigate through calendar dates and select a date. |
| Properties | Name: value<br>Description: Date to set.<br>Type: DateTime<br>Allow null: true |
| Events | onChange – raises event when the date value is changed. Event contains selected DateTime value. |
| Example | None |

| | |
|---|---|
| Name | timeDatePicker |
| Description | Displays a monthly calendar and time picker where a user can navigate through calendar dates and select a date and time. Essentially the timePicker and datePicker combined. |
| Properties | Name: value<br>Description: Date and time to set.<br>Type: DateTime<br>Allow null: true |
| Events | onChange – raises event when the date value is changed. Event contains selected DateTime value. |
| Example | <br>Date and time picker |

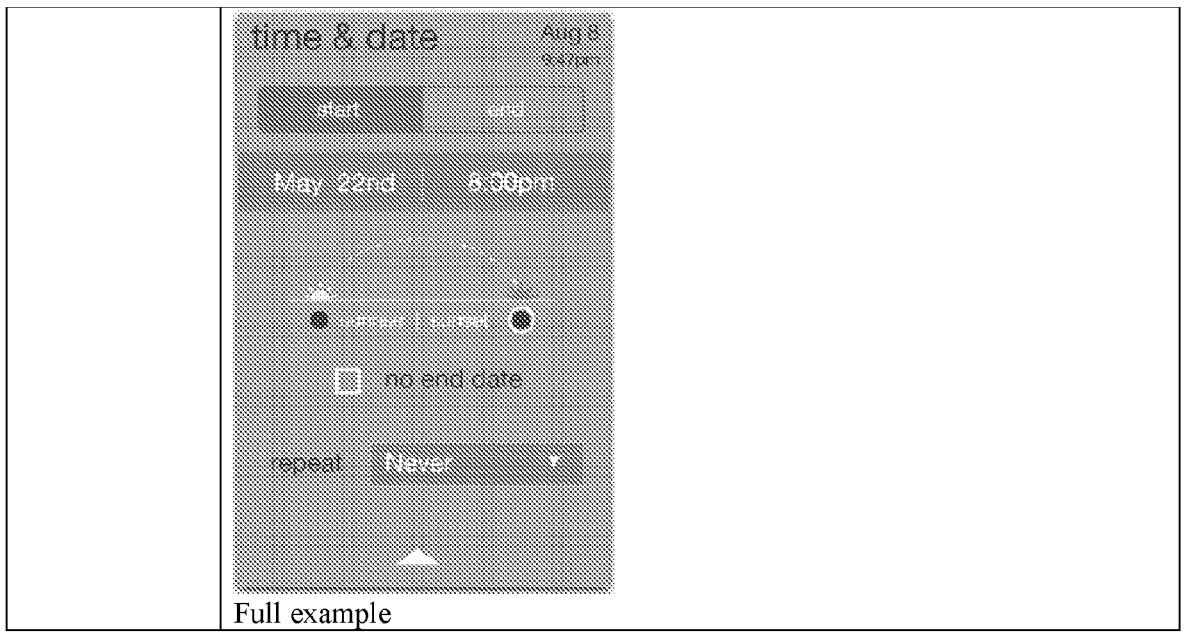
Full example

| Name | map |
|---|---|
| Description | Displays a pannable, zoomable map control where a user can navigate to a specific location, and / or specify a radius from a given location. |
| Properties | Name: coords<br>Description: Lat / Lon coordinate to set on map.<br>Type: Coords (Structure needs to be defined).<br>Allow null: true<br><br>Name: zoom<br>Description: Zoom factor. Values from -10 to 10.<br>Type: int<br>Allow null: true |
| Events | |
| Example | Full example |

| | |
|---|---|
| Name | numericUpDown |
| Description | Displays a single numeric value that the user can increment or decrement by clicking up and down buttons. |
| Properties | Name: value<br>Description: Numeric value to display inside control.<br>Type: int<br>Allow null: true<br><br>Name: mininum<br>Description: Minimum value of control.<br>Type: int<br>Allow null: false<br><br>Name: maximum<br>Description: Maximum value of control.<br>Type: int<br>Allow null: false<br><br>Name: increment<br>Description: Amount to incement or decrement value when control buttons are clicked. Type: int<br>Allow null: true<br>Default: 1 |
| Events | onChange – raises event when the value is changed. Event contains current value. |
| Example | None |

| | |
|---|---|
| Name | imagePicker |
| Description | Control that shows multiple possible selections, represented by images, where one or more images can be selected at a time. |
| Properties | Name: imageList<br>Description: Image URLs to display inside segments.<br>Type: string array<br>Allow null: true |
| Events | onSelect – raises event when an item selection within control is selected. Index of selected items are passed. |
| Example |  |

| | |
|---|---|
| | One value selected.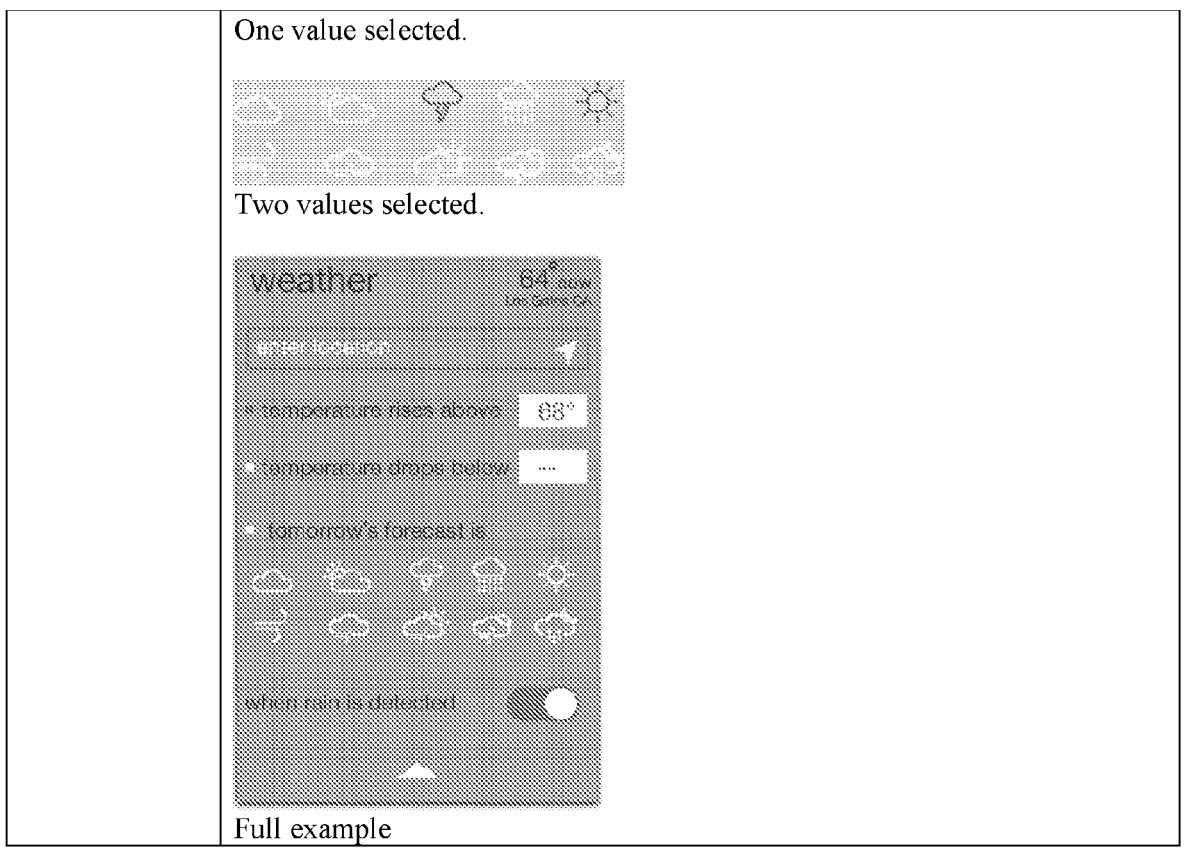Two values selected.Full example |

| | |
|---|---|
| Name | sunriseSunset |
| Description | A two-state control that displays a sunrise and sunset icon where only one be selected at a time. Same funtonality as a radiobutton. |
| Properties | Name: sunriseChecked<br>Description: Sunrise selected state.<br>Type: boolean<br>Allow null: true<br>Default: Neither checked. |
| Events | onSelect – raises event when an item selection within control is changed. Boolean value passed in event. |
| Example | 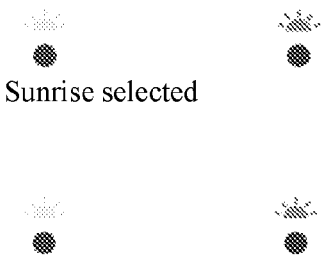Sunrise selected |

| | Sunset selected<br>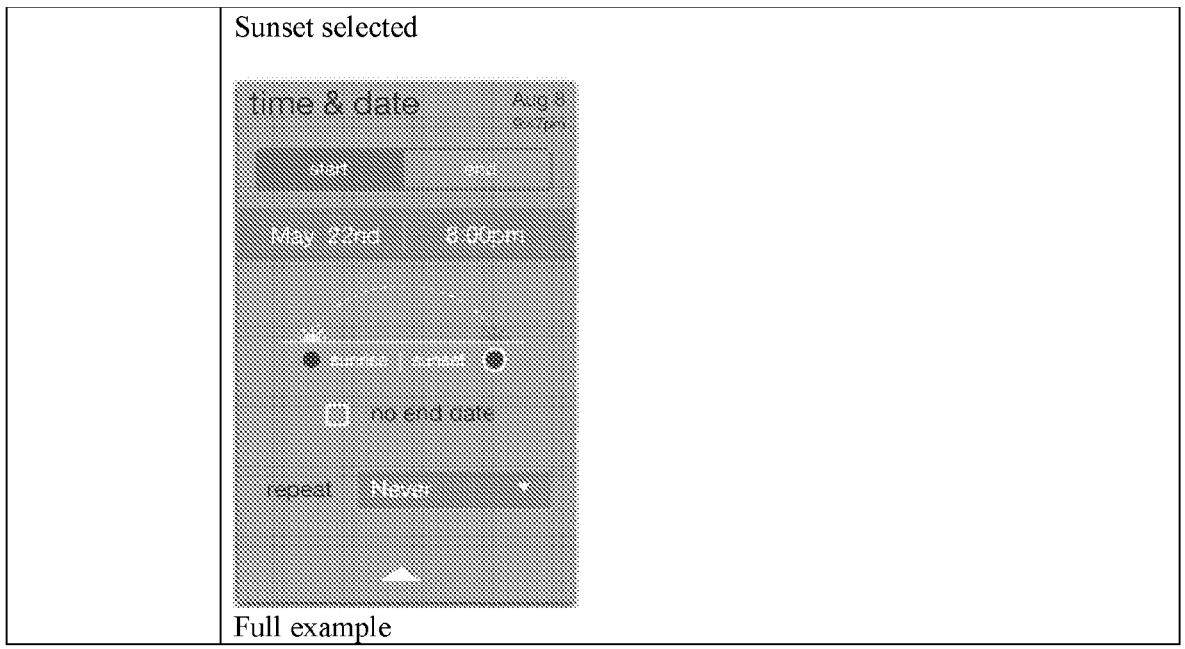<br>Full example |
|---|---|
Control layout examples
Consider the following image:
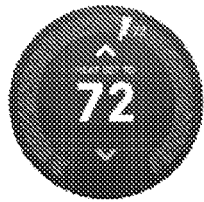
The following is an example of placed this image on a screen of a user device, centered horizontally, and starting at row 1 and spanning 2 rows:

The syntax for this configuration would be:

```
control
{
  type: image,
  name: myImage1,
  URL: http://pathToMyImage
  location: 1,1,   // x,y cell format
  rowspan: 2
  vAlign: center,    // Vertically align within the rowspan
  hAlign: center     // Horizontally align within the colspan
}
```

While the image is placed correctly, it's a little small, so in the next example, we add a larger image and also center it. In this case the location starts at column 0 and we span 3 rows and 3 columns.

```
control
{
  type: image,
  name: myImage2,
  URL: http://pathToMyImage
  location: 0, 1,   // x,y cell format
  rowspan: 3,
  colspan: 3
  vAlign: center,    // Vertically align within the rowspan
  hAlign: center     // Horizontally align within the colspan
}
```

Next we a label with a value of "Set Temp" is added:

```
control
{
  type: label,
  name: myLabel,
  value: "Set Temp:",
  location: 0, 4,   // x,y cell format
  vAlign: center,
  hAlign: right
}
```

Next to place a toggle button (a clickable, two-state button) such as the following:

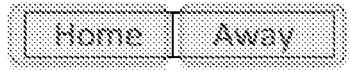
The syntax to do this looks like this:
```
control
{
  type: segmentedControl,
  name: mySC1,
  value: "Home,Away",
  location: 1, 4,   // x,y cell format
  colSpan: 2,
  vAlign: center,
  hAlign: center
}
```
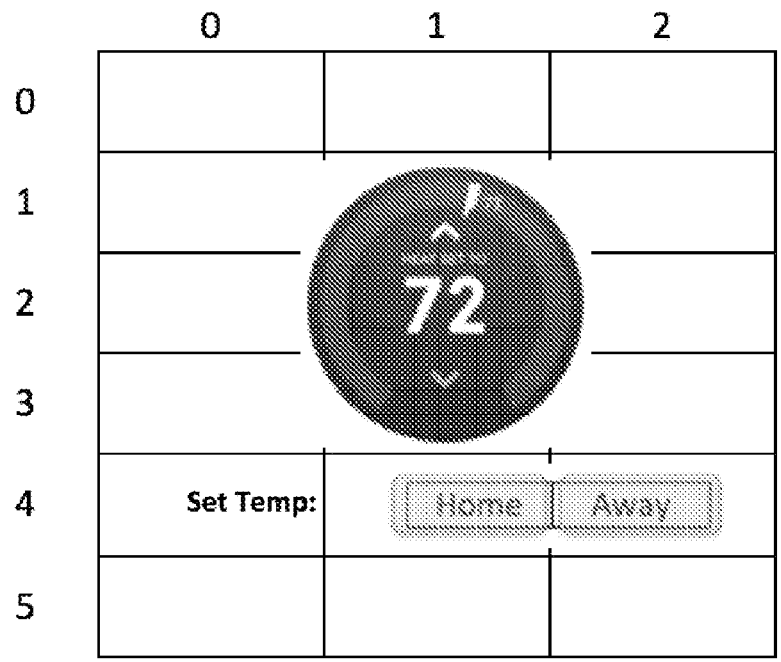
The entire syntax to create this layout is as follows:
```
rosetta
  {
    control
    {
        type: image,
        name: image1,
        URL: http://pathToMyImage
        location: 0, 1,
        rowspan: 3,
        colspan: 3
```

```
        vAlign: center,
        hAlign: center
    } control
    {
        type: label,
        name: label1,
        value: "Set Temp:",
        location: 0, 4,
        vAlign: center,
        hAlign: right
    } control
    {
        type: toggleButton,
        name: tb1,
        value: "Home,Away",
        location: 1, 4,
        colSpan: 2,
        vAlign: center,
        hAlign: center
    }
}
```

The invention claimed is:

1. A method comprising:
sending, by a first computing device and to a second computing device, at least a portion of interface information associated with an Internet of Things (IoT) device, wherein the interface information indicates a plurality of functions for controlling the IoT device and indicates positions of content in an interface associated with the IoT device to cause output of the content at the indicated positions to enable control of the IoT device; and
receiving, by the first computing device and from the second computing device, a message indicating one or more controls associated with the IoT device.

2. The method of claim 1, wherein the interface information is from a third computing device associated with a manufacturer of the IoT device.

3. The method of claim 1, wherein the portion of the interface information indicates at least one of:
dimensions of one or more user interface elements associated with the content,
identification of a type of the one or more user interface elements, or
properties associated with the one or more the user interface elements.

4. The method of claim 1, further comprising:
causing, based on the one or more controls and the interface information, the IoT device to perform one or more actions associated with the one or more controls.

5. The method of claim 1, wherein the interface information comprises at least one of:
application programming interface (API) information used to communicate with the IoT device,
security information to authenticate the second computing device when controlling the IoT device, or
metadata comprising attributes associated with the IoT device.

6. The method of claim 5, wherein the metadata further comprises a link to configuration information to enable or disable a function of the plurality of functions.

7. The method of claim 5, wherein the attributes comprise at least one of: a manufacturer of the IoT device, a mode of the IoT device, a version of the IoT device, an operating system of the IoT device, a state of the IoT device, and a protocol for communicating with the IoT device.

8. A device comprising:
one or more processors; and
memory storing instructions that, when executed by the one or more processors, cause the device to:
send, to a computing device, at least a portion of interface information associated with an Internet of Things (IoT) device, wherein the interface information indicates a plurality of functions for controlling the IoT device and indicates positions of content in an interface associated with the IoT device to cause output of the content at the indicated positions to enable control of the IoT device; and
receive, from the computing device, a message indicating one or more controls associated with the IoT device.

9. The device of claim 8, wherein the interface information is from a second computing device associated with a manufacturer of the IoT device.

10. The device of claim 8, wherein the portion of the interface information indicates at least one of:
dimensions of one or more user interface elements associated with the content,
identification of a type of the one or more user interface elements, or
properties associated with the one or more the user interface elements.

11. The device of claim 8, wherein the instructions, when executed by the one or more processors, further cause the device to:
cause, based on the one or more controls and the interface information, the IoT device to perform one or more actions associated with the one or more controls.

12. The device of claim 8, wherein the interface information comprises at least one of:
application programming interface (API) information used to communicate with the IoT device,
security information to authenticate the computing device when controlling the IoT device, or
metadata comprising attributes associated with the IoT device.

13. The device of claim 12, wherein the metadata further comprises a link to configuration information to enable or disable a function of the plurality of functions.

14. The device of claim 12, wherein the attributes comprise at least one of: a manufacturer of the IoT device, a mode of the IoT device, a version of the IoT device, an operating system of the IoT device, a state of the IoT device, and a protocol for communicating with the IoT device.

15. A non-transitory computer-readable storage medium storing computer-readable instructions that, when executed by a processor, cause:
sending, by a first computing device and to a second computing device, at least a portion of interface information associated with an Internet of Things (IoT) device, wherein the interface information indicates a plurality of functions for controlling the IoT device and indicates positions of content in an interface associated with the IoT device to cause output of the content at the indicated positions to enable control of the IoT device; and
receiving, by the first computing device and from the second computing device, a message indicating one or more controls associated with the IoT device.

16. The non-transitory computer-readable storage medium of claim 15, wherein the interface information is from a third computing device associated with a manufacturer of the IoT device.

17. The non-transitory computer-readable storage medium of claim 15, wherein the portion of the interface information indicates at least one of:
dimensions of one or more user interface elements associated with the content,
identification of a type of the one or more user interface elements, or
properties associated with the one or more the user interface elements.

18. The non-transitory computer-readable storage medium of claim 15, wherein the instructions that, when executed by the processor further cause:
causing, based on the one or more controls and the interface information, the IoT device to perform one or more actions associated with the one or more controls.

19. The non-transitory computer-readable storage medium of claim 15, wherein the interface information comprises at least one of:
application programming interface (API) information used to communicate with the IoT device,
security information to authenticate the second computing device when controlling the IoT device, or metadata comprising attributes associated with the IoT device.

20. The non-transitory computer-readable storage medium of claim 19, wherein the metadata further comprises a link to configuration information to enable or disable a function of the plurality of functions, and wherein the attributes comprise at least one of: a manufacturer of the IoT device, a mode of the IoT device, a version of the IoT device, an operating system of the IoT device, a state of the IoT device, and a protocol for communicating with the IoT device.

* * * * *